US008740243B2

(12) United States Patent
Li (10) Patent No.: US 8,740,243 B2
(45) Date of Patent: Jun. 3, 2014

(54) FOLDABLE STROLLER FRAME (75) Inventor: Jian-Qun Li, Taipei (TW)

(73) Assignee: Wonderland Nurserygoods Company Limited, Central (HK)

( * ) Notice: Subject to any disclaimer, the term of this patent is extended or adjusted under 35 U.S.C. 154(b) by 372 days.

(21) Appl. No.: 13/195,553

(22) Filed: Aug. 1, 2011

(65) Prior Publication Data
US 2012/0025491 A1 Feb. 2, 2012

(30) Foreign Application Priority Data

Aug. 2, 2010 (CN) .......................... 2010 1 0249667

(51) Int. Cl.
B62B 7/00 (2006.01)

(52) U.S. Cl.
USPC .............................. 280/642; 280/42; 280/647

(58) Field of Classification Search
USPC ........ 280/42, 47.38, 642, 646, 647, 649, 650, 280/658
See application file for complete search history.

(56) References Cited

U.S. PATENT DOCUMENTS

| 4,077,640 | A | * | 3/1978 | Perego | 280/42 |
| 4,324,410 | A | * | 4/1982 | Perego | 280/42 |
| 4,386,790 | A | * | 6/1983 | Kassai | 280/650 |
| 4,478,427 | A | * | 10/1984 | Hyde et al. | 280/642 |
| 4,632,420 | A | * | 12/1986 | Miyagi | 280/642 |
| 4,828,278 | A | * | 5/1989 | Shinroku et al. | 280/644 |
| 4,915,401 | A | * | 4/1990 | Severson et al. | 280/30 |
| 5,110,150 | A | * | 5/1992 | Chen | 280/642 |
| 6,062,588 | A | * | 5/2000 | Cheng | 280/642 |
| 6,062,589 | A | * | 5/2000 | Cheng | 280/647 |
| 6,105,997 | A | * | 8/2000 | Watkins | 280/649 |
| 6,113,128 | A | * | 9/2000 | Watkins | 280/647 |
| 6,322,097 | B1 | * | 11/2001 | Lan | 280/642 |
| 6,918,608 | B2 | * | 7/2005 | Crisp | 280/642 |
| 7,584,985 | B2 | * | 9/2009 | You et al. | 280/643 |
| 7,832,744 | B2 | * | 11/2010 | Chen et al. | 280/47.4 |
| 8,066,300 | B2 | * | 11/2011 | Ohnishi | 280/647 |
| 8,366,141 | B2 | * | 2/2013 | Crisp | 280/658 |
| 2002/0113414 | A1 | * | 8/2002 | Tomasi et al. | 280/650 |
| 2012/0049485 | A1 | * | 3/2012 | Lin | 280/647 |

FOREIGN PATENT DOCUMENTS

GB 2145982 A * 4/1985 ............... B62B 7/08

* cited by examiner

Primary Examiner — J. Allen Shriver, II
Assistant Examiner — Bridget Avery
(74) Attorney, Agent, or Firm — Banner & Witcoff, Ltd (57) ABSTRACT A foldable stroller frame includes: two opposite foldable side frame units; and a foldable middle support interconnecting the side frame units. Each of the side frame units includes a handle rod, a first leg pivoted to the handle rod and adapted to be connected to a first stroller wheel, a second leg pivoted to the first leg and adapted to be connected to a second stroller wheel, and a connecting slider mounted slidably on the second leg. The handle rod has a lower end portion pivoted to the connecting slider so as to be co-slidable with the connecting slider on the second leg.

10 Claims, 9 Drawing Sheets

FOLDABLE STROLLER FRAME

CROSS-REFERENCE TO RELATED APPLICATIONS

This application claims priority of People Republic of China Application No. 201010249667.7, filed on Aug. 2, 2010.

BACKGROUND OF THE INVENTION

1. Field of the Invention

The invention relates to a foldable stroller frame, particularly to a foldable stroller frame including a leg and a handle connected slidably to the leg.

2. Description of the Related Art

Conventional foldable stroller frames normally include front and rear leg units pivoted to each other, and a handle unit pivoted to the front and rear leg units. In order to permit the stroller frame to be foldable, one of the front and rear leg units and the handle unit is required to be foldable or extra linking units are required to interconnect the front and rear leg units. People Republic of China Patent No. CN1600616 discloses a stroller including a first handle bar, a second handle bar, a first rear leg pivoted to the first handle bar, a second rear leg pivoted to the second handle bar, a first front leg pivoted to the first handle bar, a second front leg pivoted to the second handle bar, and a middle support connected to and disposed among the first and second rear legs and the first and second handle bars. The first front leg and the first rear leg are pivoted to a first linking bar so that the first front leg, the first rear leg, the first handle bar and the first linking bar cooperatively form a first four-bar linkage. The second front leg and the second rear leg are pivoted to a second linkage so that the second front leg, the second rear leg, the second handle bar and the second linking bar cooperatively form a second four-bar linkage. The aforesaid stroller frame is permitted to be foldable through the inclusion of the first and second linking bars, which makes the structure of the stroller frame more complex and results in an increase in the weight of the stroller frame.

SUMMARY OF THE INVENTION

Therefore, an object of the present invention is to provide a stroller frame that has a simple structure and is lighter in weight than the aforesaid conventional stroller frame.

According to this invention, there is provided a foldable stroller frame that comprises: two opposite foldable side frame units; and a foldable middle support interconnecting the side frame units. Each of the side frame units includes a handle rod, a first leg pivoted to the handle rod and adapted to be connected to a first stroller wheel, a second leg pivoted to the first leg and adapted to be connected to a second stroller wheel, and a connecting slider mounted slidably on the second leg. The handle rod has a lower end portion pivoted to the connecting slider so as to be co-slidable with the connecting slider on the second leg.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

FIGS. 1 to 8 illustrate the preferred embodiment of a foldable stroller frame according to this invention. The foldable stroller frame includes: two opposite foldable side frame units 110; and a foldable middle support 100 interconnecting the side frame units 110. Each of the side frame units 110 includes a handle rod 111, a first leg 121 pivoted to the handle rod 111 and adapted to be connected to a first stroller wheel 121a, a second leg 131 pivoted to the first leg 121 and adapted to be connected to a second stroller wheel 131a, and a connecting slider 161 mounted slidably on the second leg 131. The handle rod 111 has a lower end portion 1112 pivoted to the connecting slider 161 (see FIGS. 1, 2, 8 and 9) so as to be co-slidably with the connecting slider 161 on the second leg 131.

In this embodiment, the connecting slider 161 has a cylindrical sleeve portion 1611 (see FIGS. 2, 8 and 9) and an ear plate portion 1612 extending outwardly from the sleeve portion 1611. The sleeve portion 1611 is slidably sleeved on the second leg 131.

Figure 10:
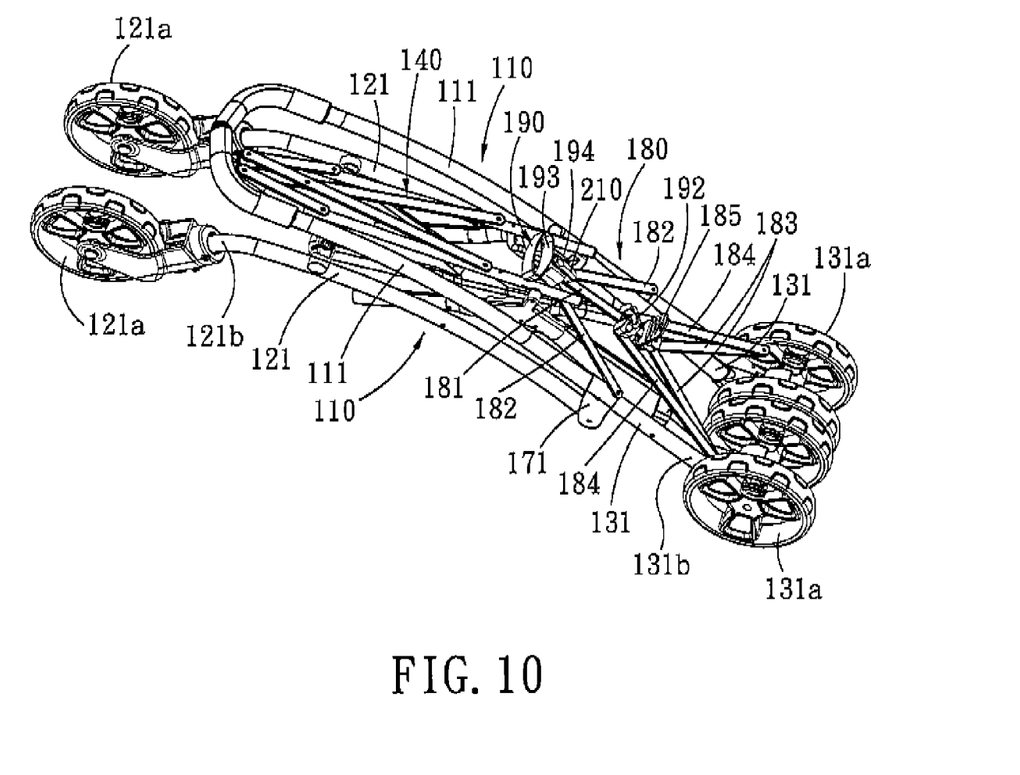
FIG. 10 is a perspective view illustrating a folding state of the preferred embodiment.

Each of the first and second legs 121, 131 has a bottom end 121b, 131b. The bottom ends 121b, 131b of the first and second legs 121, 131 are connected to the first and second stroller wheels 121a, 131a, respectively. The stroller frame is operable between a folded state (see FIG. 10) and an extended state (see FIGS. 1, 2, 3 and 8). The bottom ends 121b, 131b of the first and second legs 121, 131 are moved toward each other when the stroller frame is extended from the folded state (see FIG. 10) to the extended state (see FIG. 8), and are moved away from each other when the stroller frame is folded from the extended state to the folded state.

The stroller frame of the preferred embodiment further includes a foldable stretching unit 180 and a locking unit 190. The stretching unit 180 is disposed between and is pivoted to the side frame units 110 so as to be co-foldable with the side frame units 110. The side frame units 110 are moved toward each other when the stroller frame is folded from the extended state (see FIGS. 1 and 3) to the folded state (see FIG. 10), and are moved away from each other when the stroller frame is extended from the folded state to the extended state. The locking unit 190 is operable to lock the stretching unit 180 against folding from an extended position (see FIGS. 1, 3 and 4) to a folded position (see FIG. 10), thereby preventing the side frame units 110 from moving toward each other.

The stretching unit 180 includes a vertical pulling rod 181 having upper and lower end portions 1811, 1812 (see FIGS. 3, 4 and 5), two upper lateral rods 182, and two lower lateral rods 183. A pedal 185 is secured to the lower end portion 1812 of the vertical pulling rod 181. The locking unit 190 includes an upper seat 194, a pulling handle 193 formed on the upper seat 194, a lower seat 192 spaced apart from the upper seat 194, two linking rods 184, and a resiliently biased latch 210. The upper seat 194 is secured to the upper end portion 1811 of the vertical pulling rod 181 through a fastener 195 (see FIGS. 4 and 5). The lower seat 192 is slidably mounted to the vertical pulling rod 181 so as to permit relative movement of the upper and lower seats 194, 192. The upper lateral rods 182 are pivoted to the handle rods 111 of the side frame units 110 and two opposite sides of the upper seat 194, respectively (see FIG. 3). The lower lateral rods 183 are pivoted to the handle rods 111 of the side frame units 110, respectively, and to the lower end portion 1812 of the vertical pulling rod 181 (see FIGS. 3 and 4). The linking rods 184 have lower ends pivoted to the handle rods 111 of the side frame units 110, respectively, and upper ends pivoted to the lower seat 192 (see FIGS. 3 and 4) so as to form an inverted V-shaped configuration.

The latch 210 is attached to one of the upper and lower seats 194, 192, and engages releasably the other of the upper and lower seats 194, 192 so as to prevent the upper and lower seats 194, 192 from moving away from each other and the linking rods 184 from changing in configuration, thereby preventing folding of the stroller frame. In this embodiment, the latch 210 is attached to the upper seat 194, and engages the lower seat 192. It is noted that in order to fold the stroller frame, the lower ends of the linking rods 184 are required to be able to move toward each other (see FIG. 10). Hence, when the latch 210 engages the lower seat 192, the lower seat 192 is inhibited to move along the vertical pulling rod 181 (see FIG. 3), which prevents the linking rods 184 from rotating toward each other.

Figure 5:
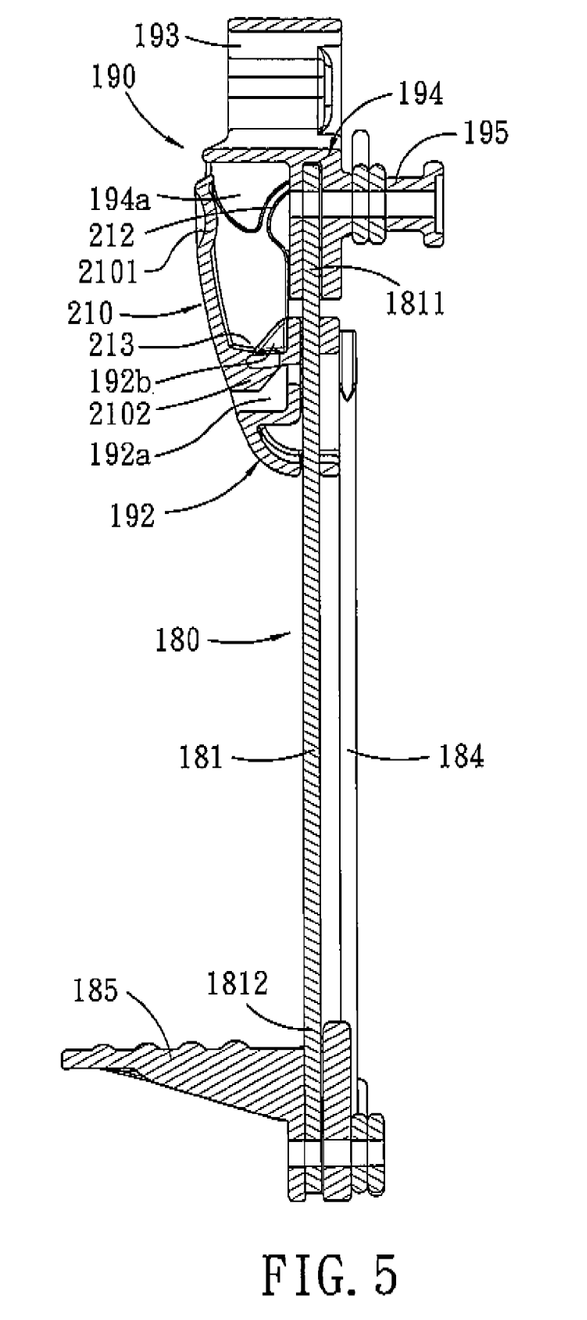
FIG. 5 is a schematic sectional side view of the assembly of a stretching unit and a locking unit of the preferred embodiment.
Figure 6:
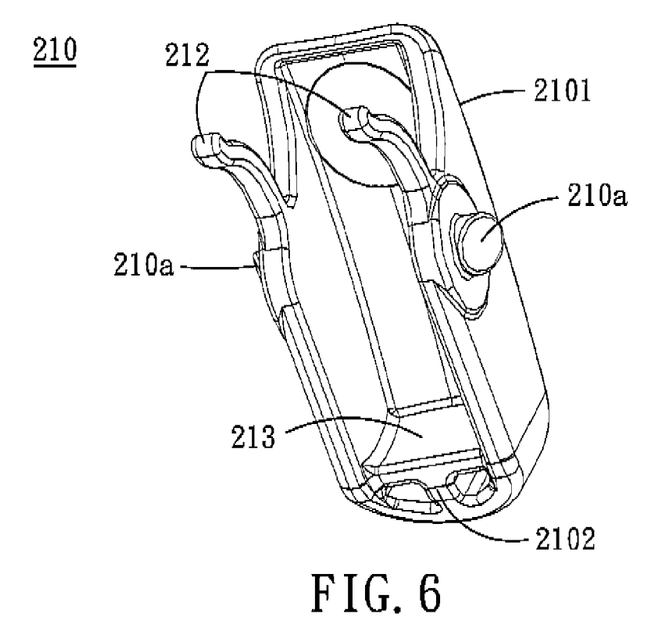
FIG. 6 is a perspective view of a latch of the locking unit of the preferred embodiment.
Figure 7:
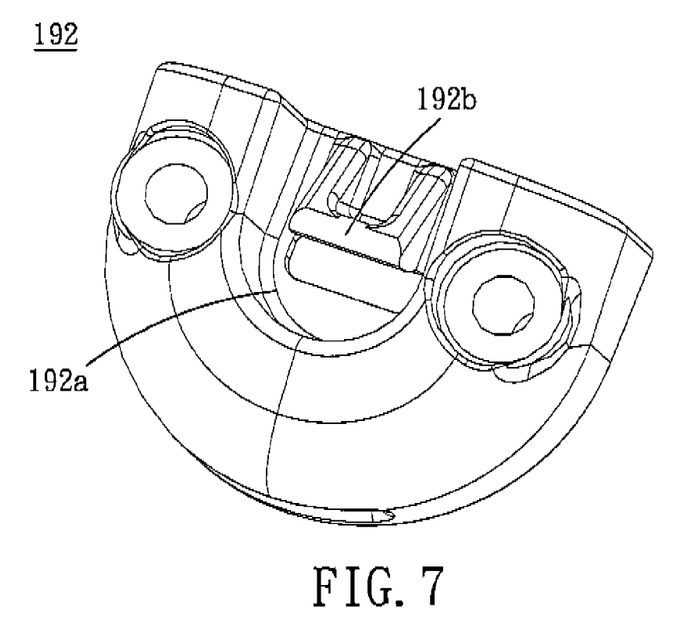
FIG. 7 is a perspective view of a lower seat of the locking unit of the preferred embodiment.
Figure 8:
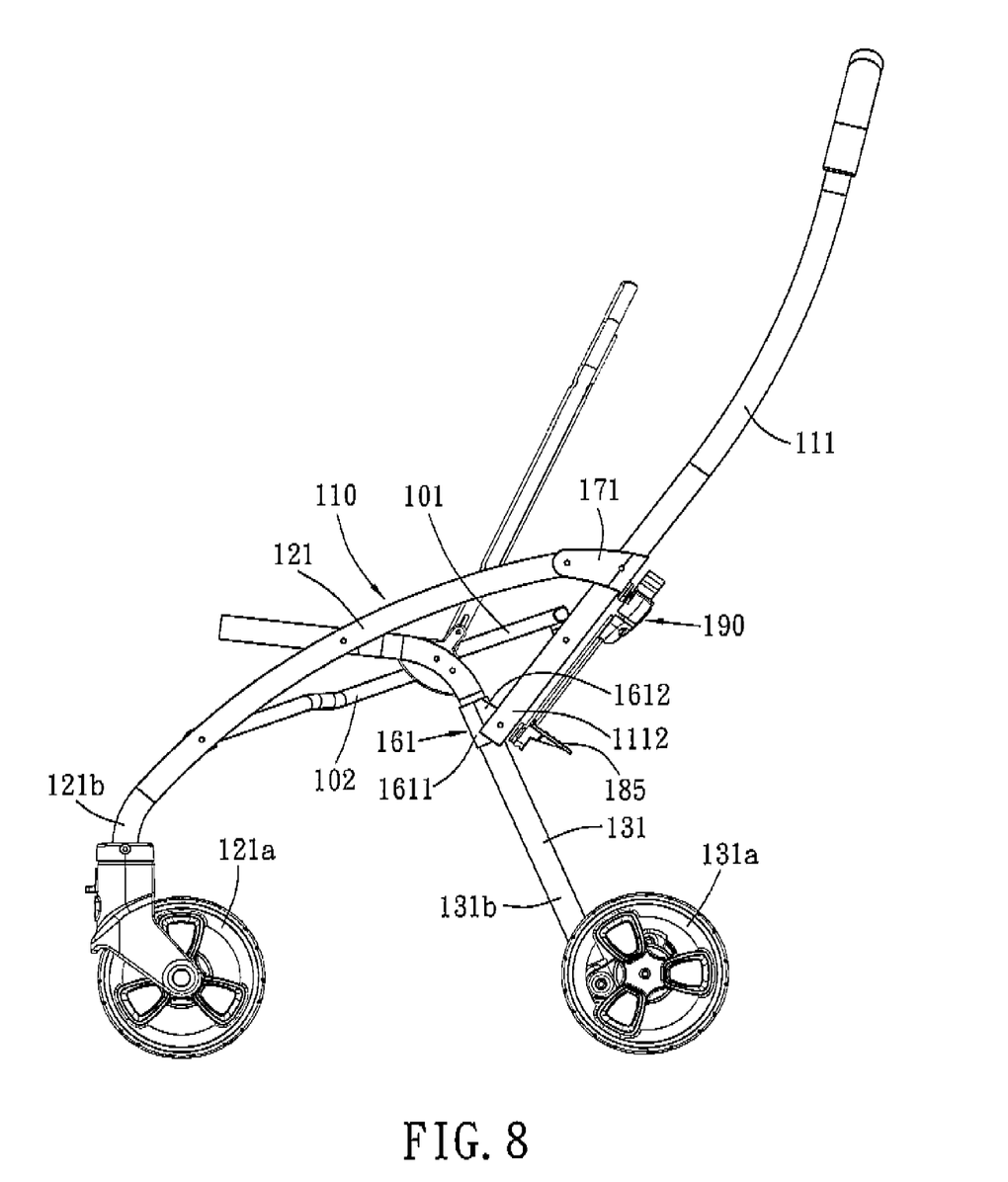
FIG. 8 is a schematic side view of the preferred embodiment, viewing from an opposite side of the preferred embodiment.

The upper seat 194 is formed with an upper recess 194a (see FIG. 5). The latch 210 has upper and lower portions 2101, 2102 (see FIGS. 5 and 6). The upper portion 2101 of the latch 210 extends into the upper recess 194a, and is formed with pivot studs 210a (see FIG. 6) pivoted to the upper seat 194 so as to permit the latch 210 to be rotatable relative to the upper seat 194 between a locking position (see FIG. 5) and a releasing position (not shown). The upper and lower portions 2101, 2102 cooperatively defining an engaging recess 213 (see FIGS. 5 and 6). The lower seat 192 is formed with a lower recess 192a and an engaging protrusion 192b protruding therefrom into the lower recess 192a. The lower portion 2102 of the latch 210 extends into the lower recess 192a and the engaging protrusion 192b engages releasably the engaging recess 213 (see FIG. 5) when the latch 210 is disposed at the locking position. The lower portion 2102 of the latch 210 is disposed outside of the lower recess 192a and the engaging protrusion 192b is disengaged from the engaging recess 213 when the latch 210 is disposed at the releasing position (not shown).

The upper portion 2101 of the latch 210 is further formed with a resilient arm 212 extending into the upper recess 194a (see FIG. 5) and abutting resiliently against the upper seat 194 so that when the upper portion 2101 of the latch 210 is pressed to rotate the latch 210 from the locking position to the releasing position, the resilient arm 212 can accumulate a restoring force to restore the latch 210 from the releasing position to the locking position.

The middle support 100 includes two crossing rods 101, 102 pivoted to and crossing each other. Each of the crossing rods 101, 102 is pivoted to the handle rod 111 of one of the side frame units 110 and to the first leg 121 of the other of the side frame units 110.

Figure 1:
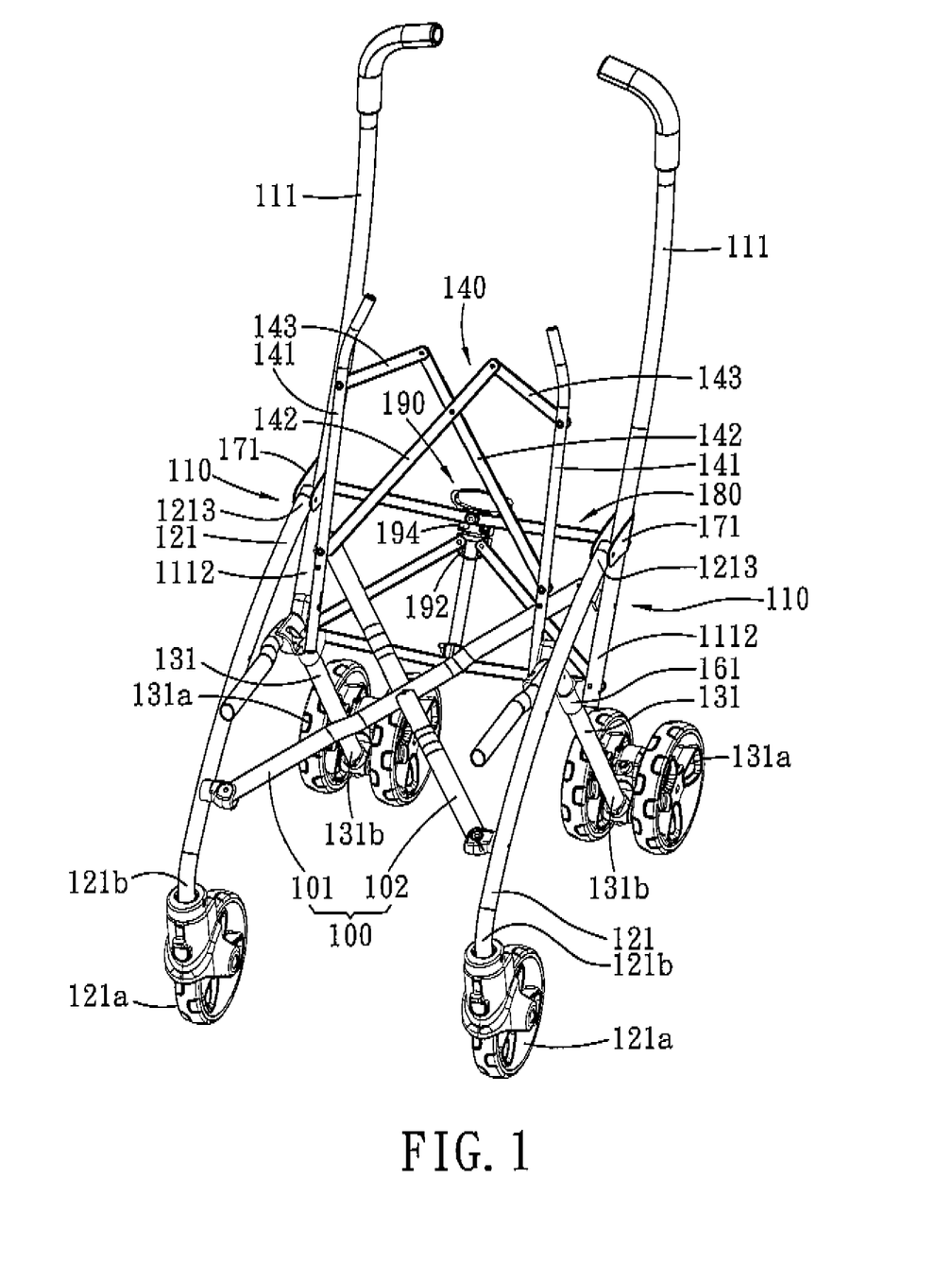
FIG. 1 is a front perspective view of the preferred embodiment of a foldable stroller frame according to the invention.
Figure 2:
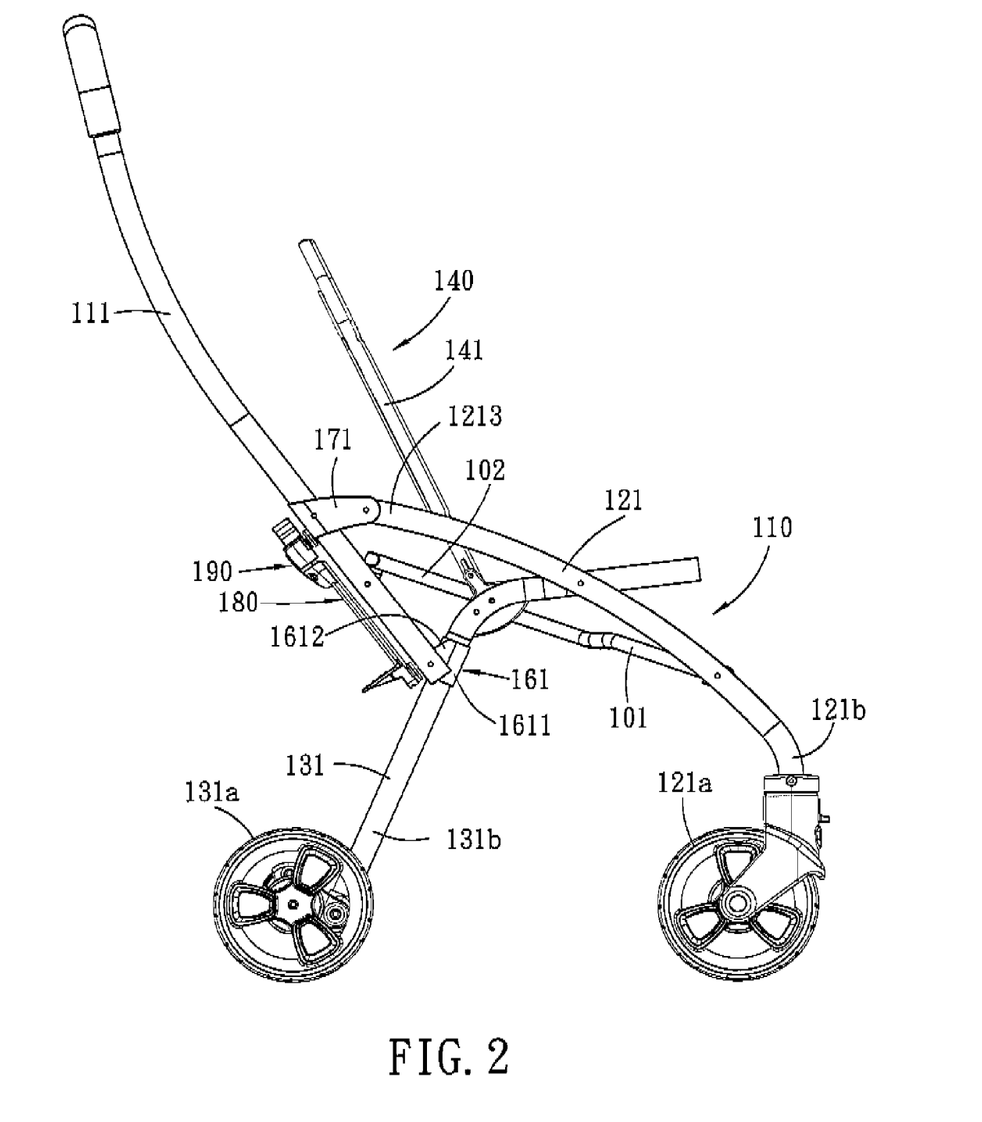
FIG. 2 is a schematic side view of the preferred embodiment, viewing from one side of the preferred embodiment.
Figure 3:
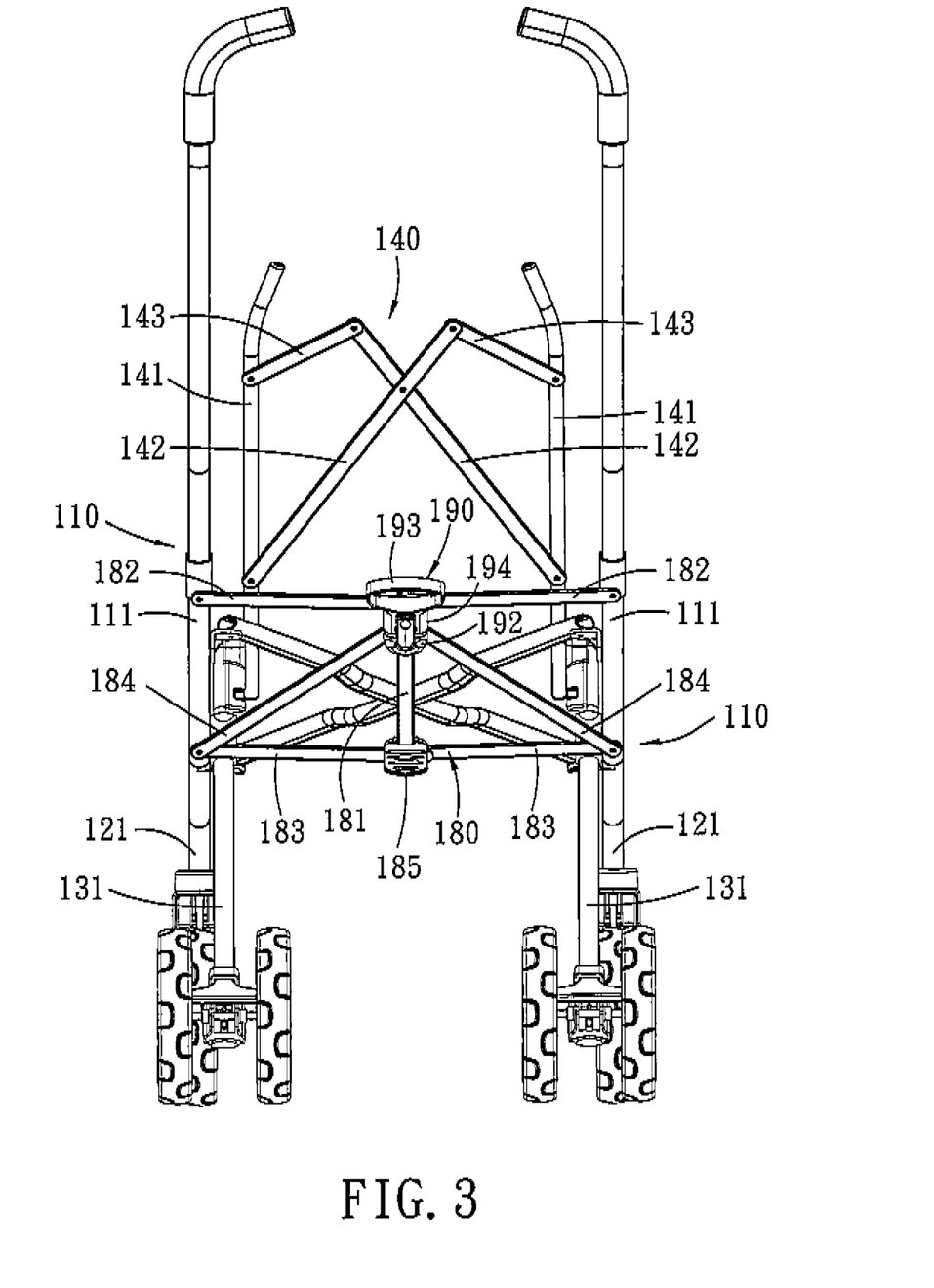
FIG. 3 is a schematic rear view of the preferred embodiment.
Figure 4:
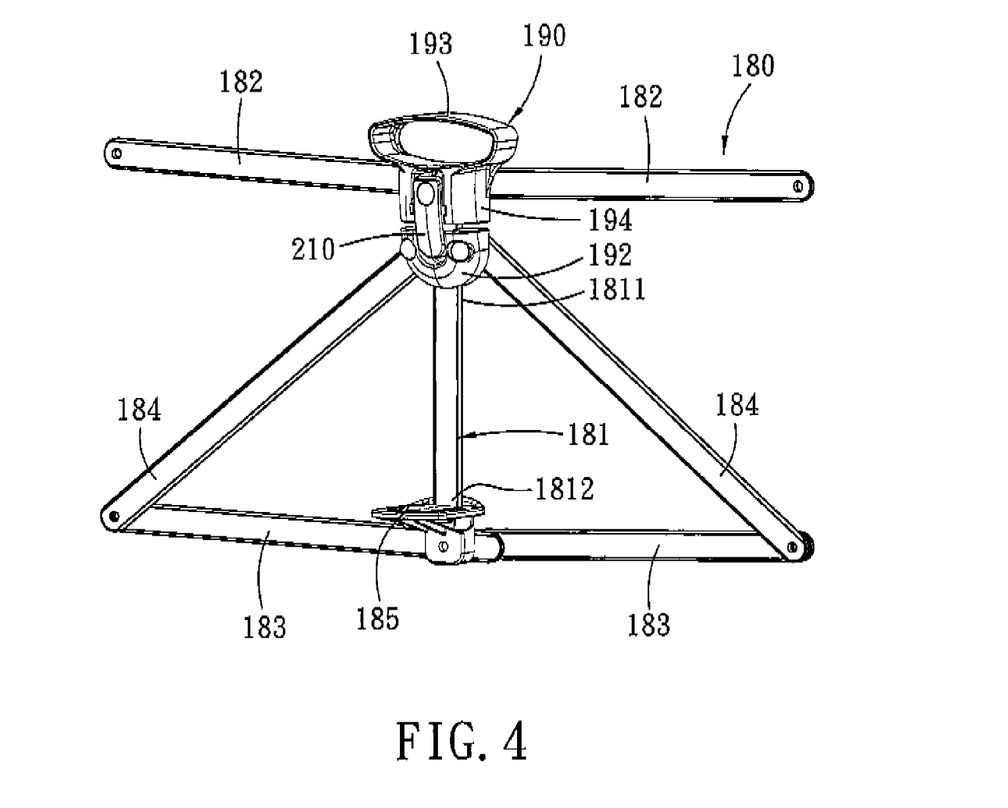
FIG. 4 is a perspective view of an assembly of a stretching unit and a locking unit of the preferred embodiment.

The stroller frame of the preferred embodiment further includes a foldable backrest assembly 140 connected to second legs 131 of the side frame units 110 (see FIGS. 1 to 3). The backrest assembly 140 includes two vertical beams 141, two crossing beams 142, and two interconnecting beams 143. The vertical beams 141 are pivoted to the second legs 131 of the side frame units 110, respectively. The crossing beams 142 are pivoted to and cross each other, and are further pivoted to the vertical beams 141, respectively. Each of the interconnecting beams 143 is pivoted to a respective one of the vertical beams 141 and a respective one of the crossing beams 142.

Each of the side frame units 110 further includes an ear plate 171 (see FIGS. 1 and 2) secured to the handle rod 111. The first leg 121 has an upper end 1213 pivoted to the ear plate 171.

Figure 9:
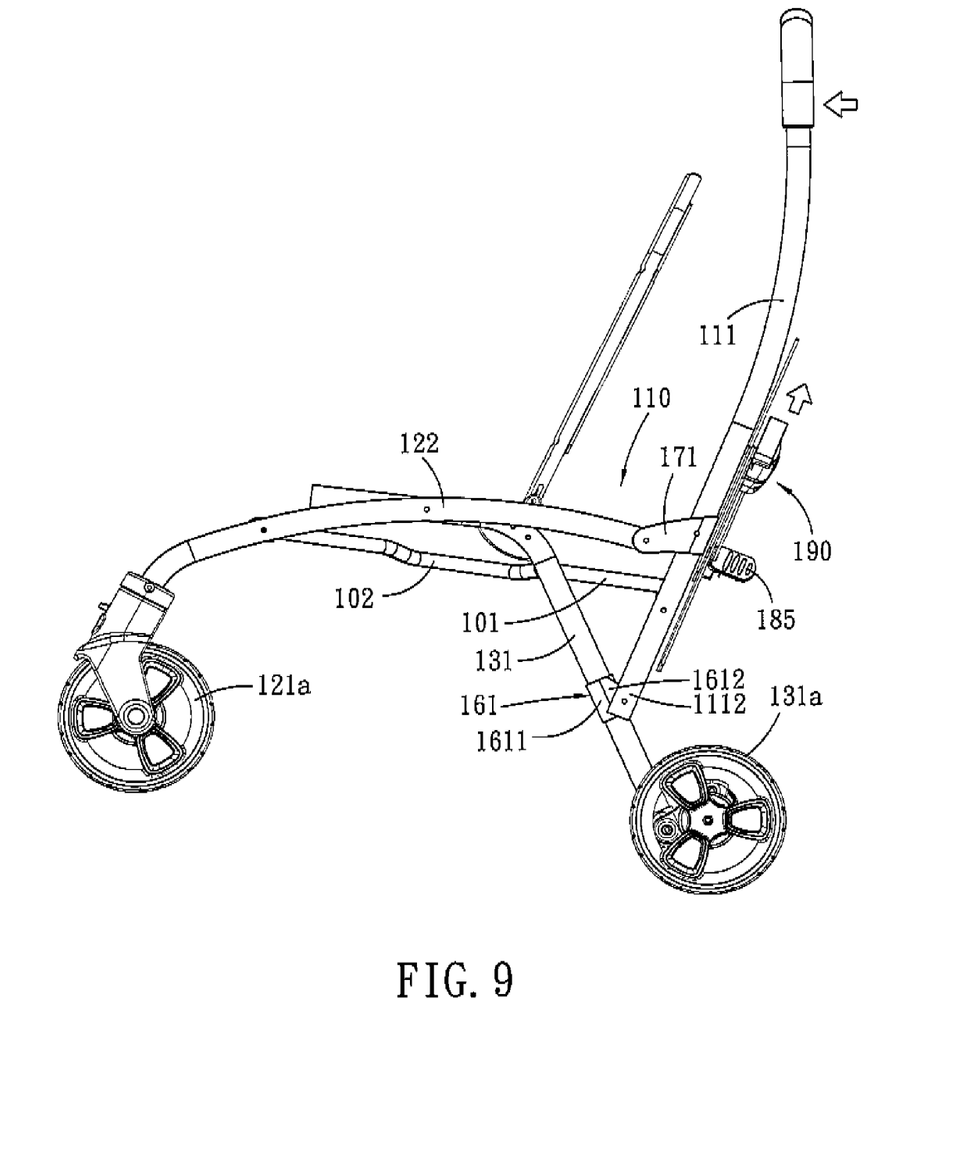
FIG. 9 is a schematic side view illustrating a folding operation of the preferred embodiment, wherein a vertical pulling rod is pulled upward and a handle rod is moved frontward and slides downwardly on a rear leg.

In a folding operation, the upper portion 2101 of the latch 210 is pressed to release engagement between the latch 210 and the lower seat 192, followed by pulling upward the vertical pulling rod 181 and moving forward the handle rods 111 toward the first legs 121 to fold the stroller frame (see FIG. 9). The upward pulling action of the vertical pulling rod 181 results in upward movement of the upper seat 194 and the vertical pulling rod 181 relative to the lower seat 192 and the linking rods 184 and in folding of the upper lateral rods 182, the lower lateral rods 183, the linking rods 184, the crossing rods 101, 102 and the side frame units 110 toward each other. The forward moving action of the handle rods 111 results in movement of the handle rods 111 and the first legs 121 toward each other and overlapping of the handle rods 111 and the first and second legs 121, 131 (see FIG. 10).

In an extending operation, the handle rods 111 of the side frames 110 are lifted to move away from the first legs 121 by the stroller operator's hand and the pedal 185 is pressed downward by the stroller operator's foot to cause pivotal extension of the upper lateral rods 182, the lower lateral rods 183, and the linking rods 184, which, in turn, results in pivotal extension of the crossing rods 101, 102 and the side frame units 110 until the stroller frame is fully extended.

With the use of the connecting sleeves 161 on the second legs 131 to connect slidably the handle rods 111 to the second legs 131, the stroller frame of the present invention can be foldable without forming a four-bar linkage structure, and the arrangement as such can improve the aforesaid drawbacks associated with the prior art. In addition, lifting of the handle rods 111 of the side frames 110 away from the first legs 121 from a folded state, or a lower position, to extend the stroller frame is convenient and easy for the stroller operator.

While the present invention has been described in connection with what are considered the most practical and preferred embodiment, it is understood that this invention is not limited to the disclosed embodiment but is intended to cover various arrangements included within the spirit and scope of the broadest interpretation 50 as to encompass all such modifications and equivalent arrangements.

What is claimed is:
1. A foldable stroller frame comprising:
two opposite foldable side frame units; and
a foldable middle support interconnecting said side frame units;
wherein each of said side frame units includes a handle rod, a first leg pivoted to said handle rod and adapted to be connected to a first stroller wheel, a second leg pivoted to said first leg and adapted to be connected to a second stroller wheel, and a connecting slider mounted slidably on said second leg, said handle rod having a lower end portion pivoted to said connecting slider so as to be co-slidable with said connecting slider on said second leg;

wherein each of said first and second legs has a bottom end, said bottom ends of said first and second legs being adapted to be connected to the first and second stroller wheels, respectively, said stroller frame being operable between a folded state and an extended state, said bottom ends of said first and second legs being moved toward each other when said stroller frame is extended from the folded state to the extended state, and being moved away from each other when said stroller frame is folded from the extended state to the folded state.

2. The foldable stroller as claimed in claim 1, wherein said connecting slider has a cylindrical sleeve portion and an ear plate portion extending outwardly from said sleeve portion, said sleeve portion being slidably sleeved on said second leg.

3. The foldable stroller frame as claimed in claim 1, further comprising a foldable stretching unit and a locking unit, said stretching unit being disposed between and being pivoted to said side frame units so as to be co-foldable with said side frame units, said side frame units being moved toward each other when said stroller frame is folded from the extended state to the folded state, and being moved away from each other when said stroller frame is extended from the folded state to the extended state, said locking unit being operable to lock said stretching unit against folding from an extended position to a folded position, thereby preventing said side frame units from moving toward each other.

4. The foldable stroller frame as claimed in claim 1, wherein said middle support includes two crossing rods pivoted to and crossing each other, each of said crossing rods being pivoted to said handle rod of one of said side frame units and to said first leg of the other of said side frame units.

5. The foldable stroller frame as claimed in claim 1, further comprising a foldable backrest assembly including two vertical beams, two crossing beams, and two interconnecting beams, said vertical beams being pivoted to said second legs of said side frame units, respectively, said crossing beams being pivoted to and crossing each other, and being further pivoted to said vertical beams, respectively, each of said interconnecting beams being pivoted to a respective one of said vertical beams and a respective one of said crossing beams.

6. The foldable stroller frame as claimed in claim 1, wherein each of said side frame units further includes an ear plate secured to said handle rod, said first leg having an upper end pivoted to said ear plate.

7. The foldable stroller frame as claimed in claim 3, wherein said stretching unit includes a vertical pulling rod having upper and lower end portions, two upper lateral rods, and two lower lateral rods, said locking unit including an upper seat, a lower seat, two linking rods, and a resiliently biased latch, said upper seat being secured to said upper end portion of said vertical pulling rod, said lower seat being slidably mounted to said vertical pulling rod so as to permit relative movement of said upper and lower seats, said upper lateral rods being pivoted to said handle rods of said side frame units and two opposite sides of said upper seat, respectively, said lower lateral rods being pivoted to said handle rods of said side frame units, respectively, and to said lower end portion of said vertical pulling rod, said linking rods being pivoted to said handle rods of said side frame units, respectively, and to said lower seat, said latch being attached to one of said upper and lower seats and engaging releasably the other of said upper and lower seats so as to prevent said upper and lower seats from moving away from each other, thereby preventing folding of said stroller frame.

8. The foldable stroller frame as claimed in claim 7, wherein said upper seat is formed with an upper recess, said latch having upper and lower portions, said upper portion of said latch extending into said upper recess and being pivoted to said upper seat so as to permit said latch to be rotatable relative to said upper seat between a locking position and a releasing position, said upper and lower portions cooperatively defining an engaging recess, said lower seat being formed with a lower recess and an engaging protrusion protruding therefrom into said lower recess, said lower portion of said latch extending into said lower recess and said engaging protrusion engaging releasably said engaging recess when said latch is disposed at the locking position.

9. The foldable stroller frame as claimed in claim 7, further comprising a pedal secured to said lower end portion of said vertical pulling rod.

10. The foldable stroller frame as claimed in claim 8, wherein said upper portion of said latch is further formed with a resilient arm extending into said upper recess and abutting resiliently against said upper seat.

\* \* \* \* \*